(12) United States Patent
Allison et al.

(10) Patent No.: US 7,403,537 B2
(45) Date of Patent: Jul. 22, 2008

(54) METHODS AND SYSTEMS FOR MOBILE APPLICATION PART (MAP) SCREENING IN TRANSIT NETWORKS

(75) Inventors: Rick L. Allison, Cary, NC (US); Wallace C. Williams, Cary, NC (US); Devesh Agarwal, Raleigh, NC (US); Prabhakar Golla, Cary, NC (US)

(73) Assignee: Tekelec, Morrisville, NC (US)

( * ) Notice: Subject to any disclaimer, the term of this patent is extended or adjusted under 35 U.S.C. 154(b) by 726 days.

(21) Appl. No.: 10/824,318

(22) Filed: Apr. 14, 2004

(65) Prior Publication Data

US 2005/0232236 A1   Oct. 20, 2005

(51) Int. Cl.
*H04M 7/00* (2006.01)
*H04M 15/00* (2006.01)
*H04J 3/12* (2006.01)
*H04Q 7/22* (2006.01)

(52) U.S. Cl. .............. 370/426; 370/355; 370/401; 370/467; 455/445; 455/466

(58) Field of Classification Search ......... 370/238–352, 370/355–467; 455/426–445, 467–560, 412–423; 709/224–238
See application file for complete search history.

(56) References Cited

U.S. PATENT DOCUMENTS

| | | | |
|---|---|---|---|
| 5,579,371 | A | 11/1996 | Aridas et al. |
| 6,006,098 | A | 12/1999 | Rathnasabapathy et al. |
| 6,091,958 | A | 7/2000 | Bergkvist et al. |
| 6,091,959 | A | 7/2000 | Souissi et al. |
| 6,097,948 | A * | 8/2000 | Sjodin ............ 455/426.1 |
| 6,097,960 | A | 8/2000 | Rathnasabapathy et al. |
| 6,119,014 | A | 9/2000 | Alperovich et al. |
| 6,122,510 | A | 9/2000 | Granberg |
| H1895 | H | 10/2000 | Hoffpauir et al. |
| 6,134,438 | A | 10/2000 | Sawyer |
| 6,144,663 | A | 11/2000 | Hallenstal |
| 6,175,743 | B1 | 1/2001 | Alperovich et al. |

(Continued)

FOREIGN PATENT DOCUMENTS

DE     198 05 261     8/1999

(Continued)

OTHER PUBLICATIONS

Sidebottom et al., "Signaling System 7 (SS7) Message Transfer Part 3 (MTP3)—User Adaptation Layer (M3UA)," http://www.ietf.org/rfc/rfc3332.txt?number=3332, p. 1-113, (Sep. 2002).

(Continued)

*Primary Examiner*—Man Phan
(74) *Attorney, Agent, or Firm*—Jenkins, Wilson, Taylor & Hunt, P.A.

(57) ABSTRACT

A method for screening mobile application part (MAP) messages in a transit network is provided. Signaling messages are received from a first network. SCCP called party address information is extracted from each signaling message. If the called party address matches first SCCP screening criteria, it is determined whether the signaling message is a targeted MAP message type. If the signaling message is a targeted MAP message type, a screening action is performed. Different MAP screening criteria may be applied for different destination networks.

40 Claims, 6 Drawing Sheets

U.S. PATENT DOCUMENTS

| | | | |
|---|---|---|---|
| 6,308,075 B1 * | 10/2001 | Irten et al. | 455/466 |
| 6,381,465 B1 | 4/2002 | Chern et al. | |
| 6,456,845 B1 * | 9/2002 | Drum et al. | 455/424 |
| 6,505,046 B1 | 1/2003 | Baker | |
| 6,567,658 B1 | 5/2003 | Van De Graaf | |
| 6,658,260 B2 | 12/2003 | Knotts | |
| 6,836,477 B1 * | 12/2004 | West et al. | 370/352 |
| 6,990,347 B2 * | 1/2006 | McCann | 455/445 |
| 6,993,038 B2 * | 1/2006 | McCann | 370/401 |
| 7,035,239 B2 * | 4/2006 | McCann et al. | 370/335 |
| 7,092,505 B2 * | 8/2006 | Allison et al. | 379/229 |
| 7,113,781 B1 * | 9/2006 | Allison et al. | 455/432.1 |
| 2001/0046856 A1 | 11/2001 | McCann | |
| 2002/0050972 A1 | 5/2002 | De Moerloose et al. | |
| 2003/0083078 A1 | 5/2003 | Allison et al. | |
| 2005/0141552 A1 * | 6/2005 | Schwalb | 370/466 |

FOREIGN PATENT DOCUMENTS

| | | |
|---|---|---|
| EP | 0 710 043 A1 | 5/1996 |
| WO | 99/40748 | 8/1999 |
| WO | 00/76134 A1 | 12/2000 |

OTHER PUBLICATIONS

Sprague et al., "Tekelec's Transport Adapter Layer Interface," http://www.ietf.org/rfc/rfc3094.txt?number=3094, p. 1-99, (Apr. 2001).

Loughney et al., SS7 SCCP-User Adaptation Layer (SUA), http://www.ietf.org/proceedings/01mar/I-D/sigtran-sua-05.txt, p. 1-81, (Feb. 2001).

George et al., "SS7 MTP2-User Peer-to-Peer Adaptation Layer," http://www.ietf.org/proceedings/00dec/I-D/draft-ietf-sigtran-m2pa-01.txt, p. 1-33, (Nov. 22, 2000).

"Digital Cellular Telecommunications System (Phase 2+); Technical Realization of the Short Message Service (SMS); (GSM 03.40 version 7.4.0 Release 1998)," ETSI TS 100 901, ETSI, p. 1-121, (Dec. 1999).

"Digital Cellular Telecommunications System (Phase 2+); Location Registration Procedures (GSM 03.12 version 7.0.0 Release 1998)," ETSI TS 100 530, ETSI, p. 1-10, (Aug. 1999).

Kamala URS, "Roaming Notification and Local Service Control Through Short Message Service," Motorola, p. 17-19, (Mar. 1998).

"Digital Celluluar Telecommunications System (Phase 2); Mobile Application Part (MAP) Specification (GSM 09.02 version 4.16.1)," ETS 300 599, ETSI, p. 1-786, (Aug. 1997).

"Eagle Feature Guide," P/N 910-1225-01, Revision A, Tekelec, p. 1-144, (Mar. 1996).

Chatras et al., "Mobile Application Part Design Principles," International Switching Symposium, vol. 1, p. 35-42, (May-Jun. 1990).

* cited by examiner

US 7,403,537 B2

METHODS AND SYSTEMS FOR MOBILE APPLICATION PART (MAP) SCREENING IN TRANSIT NETWORKS

TECHNICAL FIELD

The present invention relates generally to methods and systems for screening signaling system 7 (SS7) messages. More particularly, the present invention relates to methods and systems for performing mobile application part (MAP) screening of SS7 messages in transit networks using called party information in addition to or instead of calling party information.

BACKGROUND ART

In conventional SS7 networks, message screening can occur at signal transfer points (STPs) in order for the service provider that owns the STP and the associated network to control access to the network. For example, a service provider may desire to only route SS7 signaling messages that are from another service provider with which the first service provider has an agreement. Another example in which screening may be desirable is when a service provider wishes to block certain types of traffic, such as spam short message service (SMS) messages, from entering the network. Yet another example in which it may be desirable to screen incoming SS7 messages is when the messages request information regarding the service provider's subscribers. In this example, it may be desirable to block such queries, charge a fee for the queries, or only allow queries of a certain type or from an authorized destination.

Screening of incoming SS7 messages at an STP has traditionally been performed at the message transfer part (MTP) or the signaling connection control part (SCCP) level. While screening at the MTP or SCCP levels may be effective for controlling traffic to or from a particular node, such screening does not effectively allow screening based on upper layer protocols in messages, such as the MAP protocol.

MAP messages are carried by the MAP protocol layer, which resides on top of the SS7 transaction capabilities application part (TCAP) and SCCP protocol layers. MAP messages provide services used by mobile telephone subscribers, such as anytime interrogation (ATI) service, short message service (SMS), and roaming service. Anytime interrogation service is a service in which queries can be sent from SS7 service control points (SCPs) to home location registers (HLRs) to determine information regarding mobile subscribers. It may be desirable for the owner of the HLR to identify ATI messages and determine whether the requester should be given access to the information. Similarly, it may be desirable to identify and either block or charge for SMS messages. For MAP messages associated with roaming subscribers, it may be desirable only to route messages from networks with which the routing network has a roaming agreement.

Previous techniques used to screen MAP messages rely on calling party address information contained in the SCCP portions of the messages. Screening MAP messages based on SCCP calling party information is useful for a telecommunications service provider to protect its subscribers and network infrastructure from different types of MAP messages from different sources. For example, screening based on SCCP calling party information in addition to MAP information may allow a telecommunications service provider to protect its subscribers from unauthorized anytime interrogation messages from a specific source network.

While screening based on calling party information allows a service provider to identify whether messages are from authorized senders, such screening techniques lack flexibility. For example, if the screening node is in a transit network located between a sending network and one or more receiving networks, it may be desirable to selectively screen messages based on the receiving network in addition or instead of the sending network. This situation may occur when one receiving network allows certain types of MAP messages into its network while another network does not allow that type of MAP messages. Screening on SCCP calling party information alone does not allow such distinctions to be made.

Accordingly, in light of the difficulties associated with conventional message screening, there exists a need for improved methods and systems for screening MAP messages in a transit network based on called party information in addition to or instead of calling party information.

DISCLOSURE OF THE INVENTION

In accordance with one aspect of the invention, a method for screening mobile application part (MAP) messages for a transit network is provided. As used herein, the term "transit network" refers to a network connected to at least two other networks through which traffic passes that is not destined for the transit network. A transit network may provide routing and global title translation services for other networks. If the transit network screened MAP messages only for its subscribers, screening based on MAP and SCCP calling party information alone may be sufficient. However, because the transit network may screen traffic for subscribers in other networks, screening using SCCP called party addresses is desirable and provides increased flexibility—especially when different destination networks that use the transit network have different screening rules.

According to one aspect of the invention, a signaling message routing node may receive signaling messages. The signaling message routing node may identify SCCP messages that contain MAP information. For the SCCP messages that contain MAP information, the signaling message routing node may extract SCCP called party address and MAP message type information. The signaling message routing node may apply a screening rule based on the SCCP called party address and MAP information. If the message is of a type that the destination represented by the called party address desires to screen, the signaling message routing node may perform a screening action. The screening action may include dropping the message, storing the message, or passing the message to the destination network.

Accordingly, it is an object of the present invention to provide a method for screening MAP messages based on called party address information in addition to or instead of calling party address information.

It is another object of the present to provide methods and systems for selectively screening MAP messages in a transit network based on called party address information.

Some of the objects of the invention having been stated hereinabove, and which are addressed in whole or in part by the present invention, other objects will become evident as the description proceeds when taken in connection with the accompanying drawings as best described hereinbelow.

DETAILED DESCRIPTION OF THE INVENTION

Figure 1:
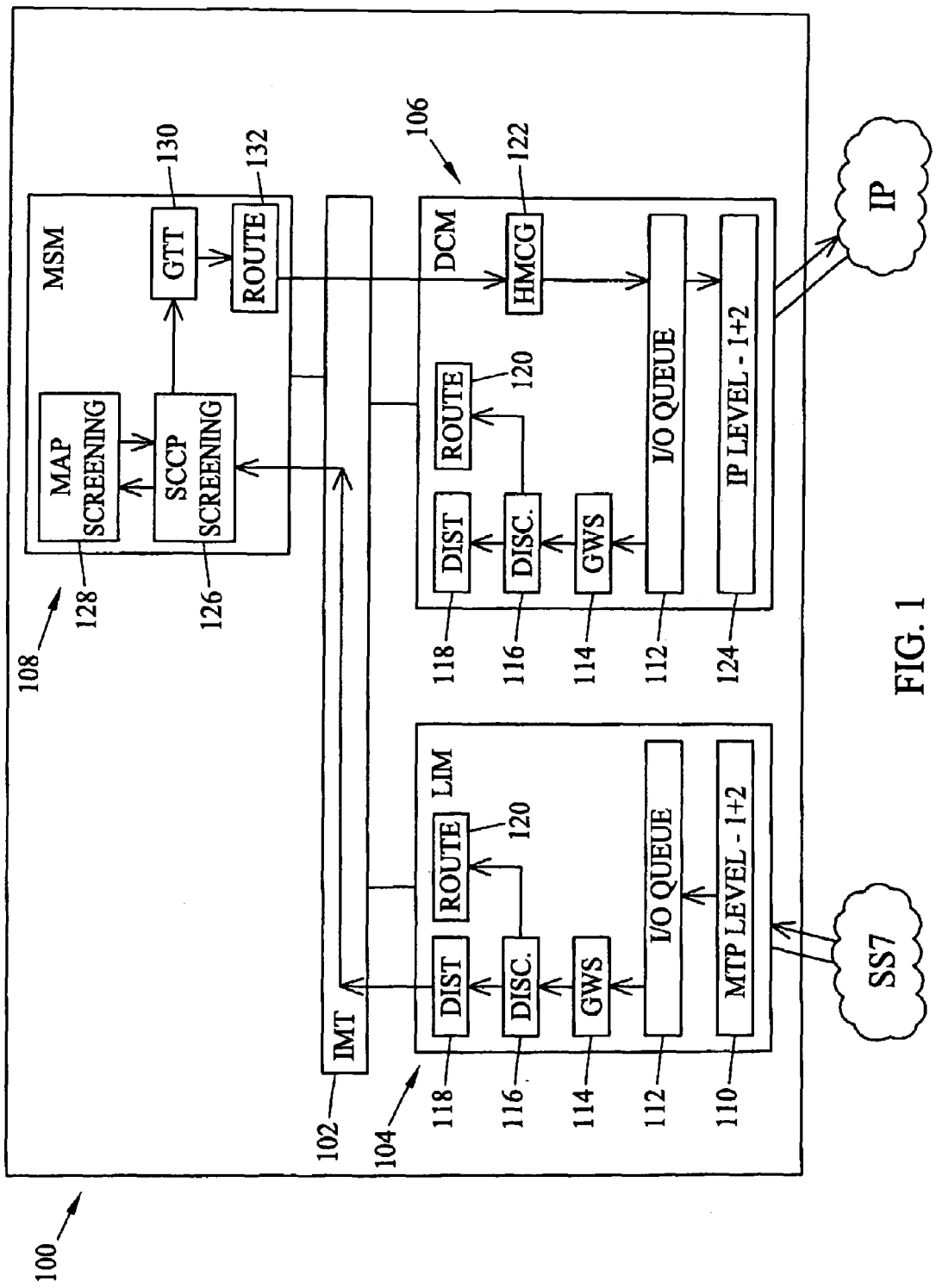
FIG. 1 is a block diagram of exemplary internal subsystems of a signaling gateway (SG) for screening MAP messages in a transit network according to an embodiment of the present invention.

The present invention includes methods and systems for screening MAP messages in a transit network using called party information instead of or in addition to calling party information. In one implementation, the methods and systems for screening MAP messages for a transit network may be implemented in a signaling message routing node, such as a signal transfer point or a signaling gateway. FIG. 1 is a block diagram illustrating an exemplary internal architecture of a signaling gateway (SG) 100 for screening MAP messages in a transit network according to an embodiment of the present invention. SG 100 may include signaling system no. 7 (SS7) signal transfer point (STP) functionality for processing SS7 messages and Internet protocol (IP) functionality for processing IP messages. In a particular embodiment, SG 100 may comprise an Eagle® SS7/IP gateway available from Tekelec of Calabasas, Calif. Alternatively, SG 100 may comprise a signal transfer point for routing SS7 signaling messages or an IP telephony signaling message routing node for routing IP telephony signaling messages.

In the illustrated embodiment, SG 100 includes an interprocessor message transport (IMT) bus 102, which provides a reliable transport mechanism for transporting messages between modules in SG 100. IMT bus 102 may include a dual counter-rotating bus so that traffic may be re-routed in response to a module failure. A number of cards or processing modules may be coupled to IMT bus 102. These cards or processing modules may include an SS7-capable link interface module (LIM) 104, an IP-capable data communication module (DCM) 106, and a MAP screening module (MSM) 108. Each of the modules may be physically connected to IMT bus 102 such that signaling and other type messages may be routed internally between all active cards or modules.

As used herein the term "module" may include a hardware component, a software component, a firmware component or any combination thereof. For example, a module may be a chip, such as an ASIC, designed to perform a specific function. Alternatively, a module may be a part of a computer program that performs a specific function or a module may be a microprocessor programmed to perform a specific function.

In one implementation, each module includes a printed circuit board having an application processor and a communications processor mounted thereon. The application processor on each module may be programmed to perform a telecommunications processing function. For example, the application processor on MAP screening module 108 may be configured to screen MAP messages for transit networks. The communications processor on each module may be programmed to perform link-level communications with other modules via IMT bus 102.

For simplicity of illustration, only single LIM, DCM, and MSM cards are included in FIG. 1. However, it should be appreciated that the distributed, multi-processor architecture of the SG node 100 facilitates the deployment of multiple LIM, DCM, MDM and other cards, all of which may be simultaneously connected to and communicating via IMT bus 102.

Focusing now on the functions of LIM card 104, in the illustrated embodiment, LIM 104 includes a number of subcomponents including an SS7 MTP level 1 and 2 process 110, an I/O buffer or queue 112, a gateway screening (GWS) process 114, an SS7 MTP level 3 discrimination process 116, a distribution process 118, and a routing process 120. MTP level 1 and 2 process 110 provides the facilities necessary to send and receive digital data over a particular physical medium. MTP level 1 and 2 process 110 also performs error detection, error correction and sequenced delivery of SS7 message packets from the SS7 network. I/O queue 112 provides for temporary buffering of incoming and outgoing signaling message packets. GWS process 114 examines received message packets and determines whether the messages should be allowed into SG 100 for processing and/or routing. Gateway screening may include examining the destination point code of the received MSU to determine whether the MSU is to be allowed into a network for which SG 100 routes messages. While this level of screening may be effective in screening message from and to specific nodes, it fails when the point codes of the nodes from which or to which it is desirable to screen messages are not known. Since point codes of source and destination network nodes may not be known to transit networks, gateway screening alone may not be sufficient for screening MAP messages in a transit network.

Discrimination process 116 performs a discrimination function, effectively determining whether an incoming SS7 message packet requires internal processing or is simply to be through-switched, i.e., routed to another node. This determination may be made by examining a destination point code in the message. If the destination point code is set to the point code of routing node 100, discrimination process 116 may determine that the message requires internal processing. If the destination point code is not set to the point code of routing node 100, discrimination process 116 may determine that the message is required to be through-switched.

In addition to examining the destination point code in a received message, discrimination process 116 may also examine the service indicator in a message to determine whether the message is an SCCP message. If the destination point code in the message is set to the point code of routing node 100 and the service indicator indicates that the message is an SCCP message, discrimination process 116 may forward the message to distribution process 118. Distribution process 118 handles the internal routing of SS7 message packets that require additional processing prior to final routing. If discrimination process 116 determines that a message should be through switched, discrimination process 116 forwards the message to routing process 120. Routing process 120 routes signaling messages to the appropriate outbound signaling links based on destination point codes in the messages.

Data communication module (DCM) 106 converts incoming IP-encapsulated SS7 messages into SS7 format and encapsulates outgoing SS7 messages in IP packets. In the illustrated embodiment, DCM 106 includes an HMCG process 120 that is responsible for monitoring congestion on the associated DCM linksets and internally communicating this link congestion information to peer processes on other modules via IMT bus 102.

As the SS7 communication protocol and the IP communication protocol are not inherently compatible, all SS7 message packets that are to be sent into the IP network are first encapsulated within an IP routing envelope prior to transmission over the IP network and decapsulated before being transmitted over the SS7 network. This IP encapsulation and decapsulation is performed by IP process 122. IP process 122 may include physical layer functionality, network layer functionality, transport layer functionality, and transport adapter layer functionality. The physical layer functionality may include any suitable physical layer function for communicating IP packets over an underlying network. In one implementation, the physical layer functionality may include Ethernet functionality. The network layer functionality may include IP functionality. The transport layer functionality may include any suitable transport layer for reliable, stream-oriented delivery of signaling messages. Exemplary transport layer protocols suitable for use with embodiments of the present invention include TCP, UDP, and SCTP.

The transport adapter layer functionality may be provided by any suitable protocol for carrying SS7 messages over the transport protocol. In one example, the transport adapter layer protocol is described in Internet Engineering Task Force (IETF) RFC 3094: Tekelec's Transport Adapter Layer Interface (TALI), April 2001, the disclosure of which is incorporated herein by reference in its entirety. The TALI protocol is also described in commonly-assigned International Patent Publication No. WO 00/76134 A1, published Dec. 14, 2000, the disclosure of which is incorporated herein by reference in its entirety. In addition to or instead of using the TALI protocol, IP process 124 may implement one or more alternate adaptation layer protocols, such as the SS7 SCCP user adaptation (SUA) layer, the SS7 MTP3 user adaptation (M3UA) layer, and the MTP level 2 peer to peer user adaptation layer (M2PA). The SUA protocol is described in IETF Internet Draft: SS7 SCCP-User Adaptation Layer (SUA), <draft-ietf-sigtran-sua-05.txt>, February 2001, the disclosure of which is incorporated herein by reference in its entirety. The M3UA protocol is described in IETF RFC 3332: Signaling System 7 (SS7) Message Transfer Protocol Part 3 (MTP3)—User Adaptation Layer (M3UA), September 2002, the disclosure of which is incorporated herein by reference in its entirety. The MTP level 2 peer to peer user adaptation layer is described in IETF Internet draft: SS7 MTP 2-User Peer-to-Peer Adaptation Layer, <draft-ieff-sigtran-m2pa-01.txt>, Nov. 22, 2000, the disclosure of which is incorporated herein by reference in its entirety.

In addition to forwarding outbound messages over an IP network, DCM 106 receive inbound IP messages. In one implementation, DCM 106 receives IP encapsulated messages. IP process 124 may remove the IP and transport layers and any transport adaptation layers from each incoming SS7 message. The message is then passed up the MTP stack and processed in a manner similar to SS7 messages received by LIM 104. In the illustrated example, DCM 106 includes gateway screening process 114, discrimination process 116, distribution process 118, and routing process 120. These processes perform the same functions as the correspondingly numbered processes described above with regard to LIM 104.

MAP screening module (MSM) 108 performs SCCP and MAP screening functions for messages received from LIM 104 and DCM 106. In the illustrated embodiment, MSM module 108 includes an SCCP screening process 126 for performing SCCP screening functions on incoming messages, a MAP screening process 128 for performing MAP screening of incoming messages, a global title translation (GTT) process 130 for performing global title translation of incoming messages, and a routing process 132 for routing messages after screening and/or global title translation has been performed.

Although not illustrated in FIG. 1, it is understood that SCCP screening process 126 may access one or more internal or external SCCP screening databases, MAP screening process 128 may access one or more internal or external MAP screening databases, and GTT process 130 may access one or more internal or external GTT databases. In accordance with one aspect of the present invention, the MAP screening database permits the MAP screening process 128 to screen incoming MAP messages based on one or more parameters, including the MAP opcode and IMSI. SCCP screening process 126 may screen messages based on SCCP parameters. In one implementation, SCCP process 126 screens messages based on called party address, in addition to or instead of calling party address. MAP screening process 128 and SCCP screening process 126 may screen MAP messages in a transit network to implement agreements between carriers. Details of screening functions performed by SCCP screening process 126 and MAP screening process 128 will now be described in detail.

Figure 2:
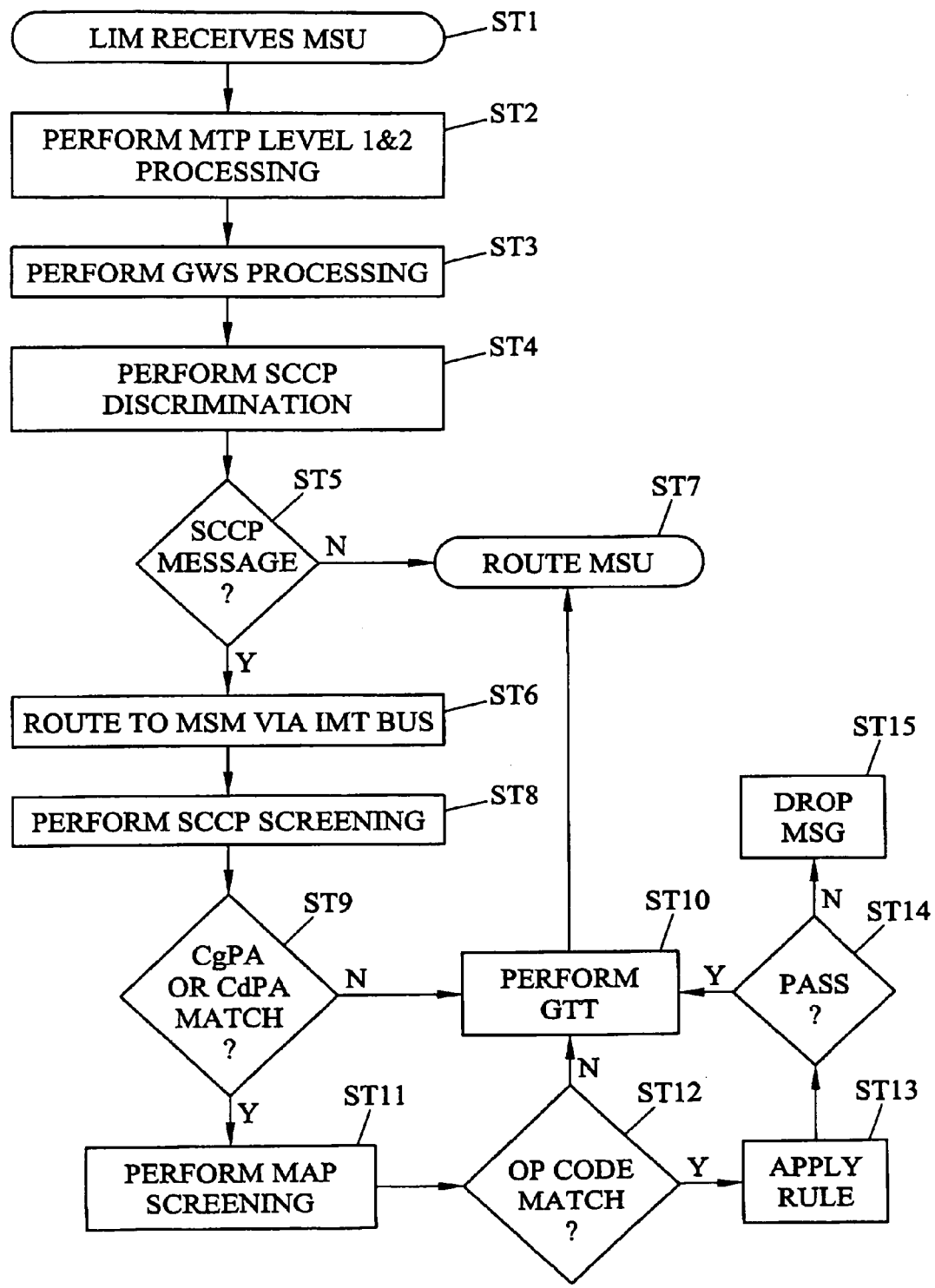
FIG. 2 is a flow chart illustrating exemplary steps that may be performed by the system illustrated in FIG. 1 for screening MAP messages in a transit network according to an embodiment of the present invention.

FIG. 2 is a flow chart illustrating exemplary steps that may be performed by the system illustrated in FIG. 1, a signal transfer point, or an IP telephony signaling message routing node for performing MAP and SCCP screening functions in a transit network according to an embodiment of the present invention. In step ST1, LIM 104 receives an SS7 message signal unit (MSU). In step ST2, MTP level 1 and 2 process 110 performs MTP level 1 and 2 processing on the incoming message. With MTP level 1 and 2 processing complete, the MSU is temporarily buffered in I/O queue 112 before being passed to gateway screening process 114.

In step ST3, gateway screening process 114 examines various MSU parameters to determine whether the message is allowed into SG 100. GWS message screening parameters may include originating point code, destination point code, and carrier ID. Once the MSU successfully completes GWS processing, the MSU is directed to the discrimination process 116.

In step ST4, discrimination process 116 performs message discrimination by examining the MSU to determine whether the MSU requires processing by SG node 100. For example, discrimination process 116 may examine the destination point code and service indicator octet parameters contained within the message transfer part header of an SS7 signaling message packet. In the event that a signaling message includes a DPC corresponding to SG 100 and an SIO value corresponding to that of an SCCP type message, the message is identified as potentially requiring MAP screening.

In step ST5, discrimination process 116 routes the message to the appropriate internal address for further processing. In this example, discrimination process 116 identifies the MSU as a SCCP message. Therefore, discrimination process 116 forwards the message to MSM 108 for further processing (ST6). If, however, the MSU was not identified as a SCCP message addressed to SG 100, discrimination process 118 may route the MSU to a communication module, such as a LIM or DCM, for transmission out of SG node 100 (ST7).

Once MSM 108 receives the message, SCCP screening process 126 performs SCCP screening (ST8) by examining the routing label of the SCCP message. If the CgPA or CdPA information matches any of the MAP screening parameters (ST9), the message is forwarded to MAP screening process 128. In order to perform MAP screening in a transit network, SCCP screening process 126 may extract the SCCP called party address from the message. For example, the called party address may be 9194938000. The called party address may be compared to individual called party addresses or ranges of called party addresses located in a MAP screening table accessible by SCCP screening process 126. If SCCP screening process 126 determines that the called party address falls within one of the ranges or individual entries, a match is indicated. Similar screening may be performed based on the calling party address in the SCCP message. Using any combination of called party and calling party screening at the SCCP layer is intended to be within the scope of the invention. In step ST9, if no match is found, control proceeds to step ST10 where global title translation is performed. After global title translation in step ST10, the message is routed to its intended destination.

If the CgPA or CdPA matches one of the screening criteria, control proceeds to step ST11 where MAP screening process 126 performs MAP screening on the message by examining the opcode field in the MAP portion of the message to determine the MAP message type and whether the message is of a type targeted for screening. In step ST12, if it is determined that the MAP message type is of a type targeted for screening, MAP screening process 128 applies the MAP/SCCP transit network screening rule. Table 1 shown below illustrates exemplary MAP/SCCP transit network screening rules that may be applied.

TABLE 1

Exemplary MAP and SCCP Screening Rules

| CdPA Ranges | CgPA Ranges | MAP Message Types | Action |
|---|---|---|---|
| 9194938000-9194938999 | * | ATI | BLOCK |
| 9193800000-9193809999 | 9197490000-9197499999 | Location Update | RECORD |
| 9193800000-9193809999 | 9194690000-9194699999 | Location Update | BLOCK |
| 9198320000-9198329999 | 9194690000-9194699999 | Location Update | ALLOW |
| * | * | * | ALLOW |

In Table 1, each row corresponds to a MAP/SCCP screening rule. In the first row in Table 1, called party address ranges from 9194938000 to 9194939999 may represent a destination network for MAP messages. This destination network may decide that anytime interrogation messages from any source network should be prohibited. Accordingly, the CgPA field may be set to a wildcard value. Thus, the first row in Table 1 represents a MAP/SCCP screening rule based on SCCP CdPA and MAP message type. The screening action to be performed when a message that matches the screening criteria is received is BLOCK, indicating that the message should not be allowed into the network.

The second row in Table 1 indicates that MAP location update messages originating from a network represented by calling party address ranges 919749000-9197499999 to a network represented by called party address ranges 9193800000-9193809999 should be recorded. In this situation, the transit network may agree to route traffic associated with roaming subscribers between the two networks while charging a fee for such routing. In order to charge the proper fee, the owner of the transit network must record some or all of the message to create a billing record and charge the appropriate fee. Accordingly, the screening action for this example is RECORD, indicating that all or part of the message should be recorded.

In the third row in Table 1, the called party address range indicates the same destination network as the rule for the second row. However, the calling party address range is different. This rule indicates that location update messages from the source network represented by 9194690000-9194699999 are to be blocked. One reason for blocking theses messages may be that the source and destination networks may not have a roaming agreement. Another reason may be that the transit network discovers that the location update messages are being routed through SG 100 without permission in an attempt to avoid fees charged by the transit network operator. Thus, the second and third rows in Table 1 illustrate the flexibility of the invention by treating the same types of messages differently based on the source network.

The fourth row in Table 1 includes the same calling party address range as the rule for the third row. However, the called party address range is different. This row indicates that location update messages from the network represented by calling party address ranges 9194690000-919469999 to the network represented by 9198320000-919832999 are to be allowed are passed without recording. Thus, the third and fourth row illustrate the flexibility of the MAP screening methods of the invention by treating the same types of messages differently based on the destination network.

The final row in Table 1 is a default rule indicating that messages not matching one of the MAP/SCCP screening rules are to be passed. It should be noted that any of the fields in Table 1 may be wildcard values. In addition, the present invention is not limited to passing MAP messages as the default rule. In an alternate implementation, the default rule may be to block all MAP messages not matching one of the specific screening rules.

Although the data in Table 1 includes ranges of called and calling party addresses to which addresses extracted from received messages are to be compared, the present invention is not limited to using ranges of called and calling party addresses. The SCCP/MAP screening rules of the present invention may include rules that are indexed by individual called and/or calling party addresses. Using individual called or calling party addresses may be necessary when a called or calling party address has been ported into or out of a service provider's network. For example, for the ported in case, a called party address that has been ported into a network may not be within the range of called party addresses for the network. As a result, a destination network may request that the transit network provision individual called party addresses in its MAP screening table to perform called party address screening for messages destined for or relating to these subscribers. For the ported out case, a destination network may request that the transit network provision individual screening rules for messages relating to ported out subscribers. The screening rules may include a screening action that notifies the sender that the subscriber is no longer a subscriber of the destination network.

Returning to FIG. 2, if application of the screening rule in steps ST13 and ST14 results in the message passing, control proceeds to step ST10 where global title translation is performed and the message is routed to its intended destination. If the message does not pass the screening rule, control proceeds to step ST15 where the message is dropped. As noted above, another screening action that may be performed is to record some or all of the messages that match one of the screening criteria.

Figure 3:
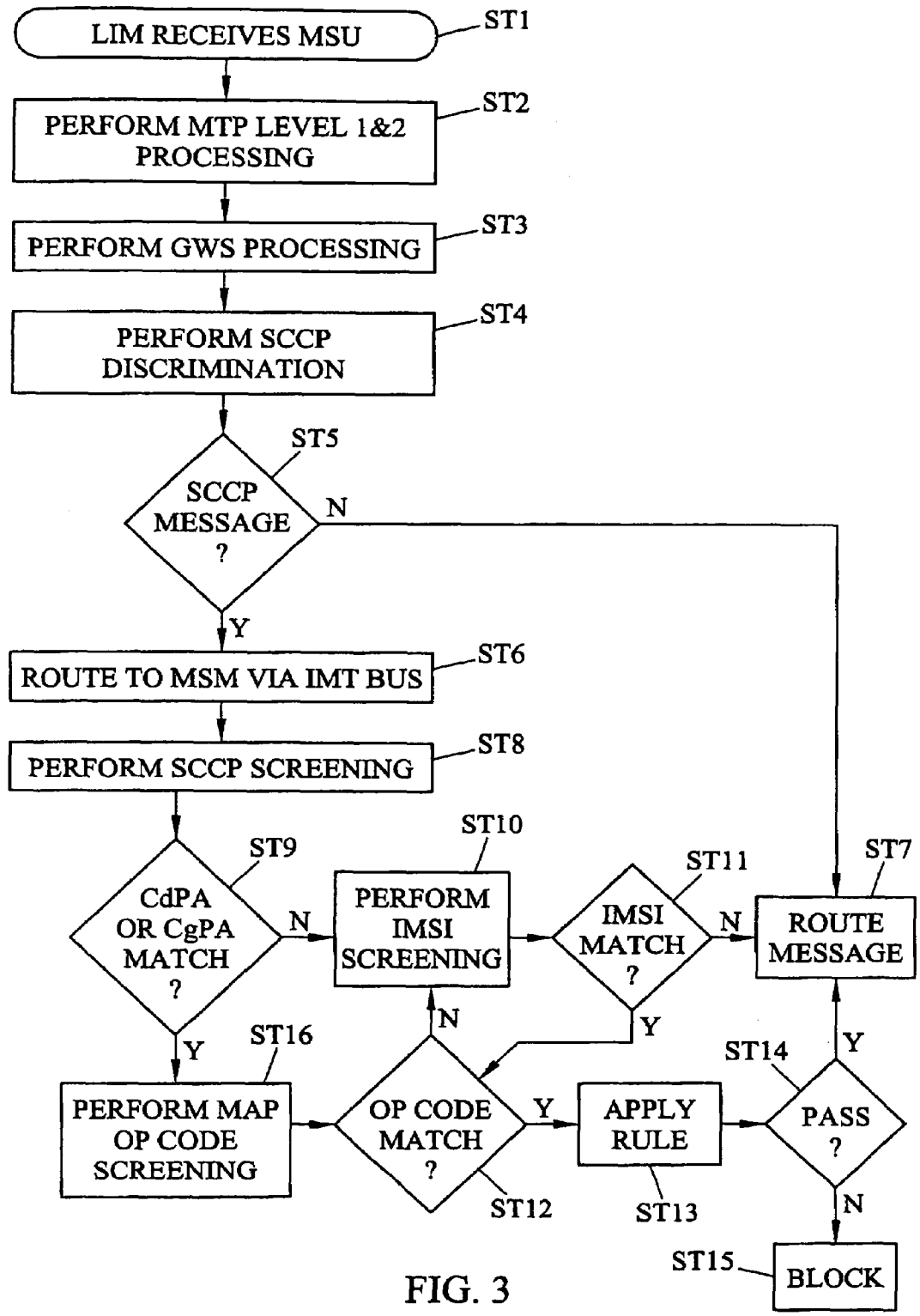
FIG. 3 is a flow chart illustrating exemplary steps that may be performed by the system illustrated in FIG. 1 for screening MAP messages in a transit network according to an alternate embodiment of the present invention.
Figure 4:
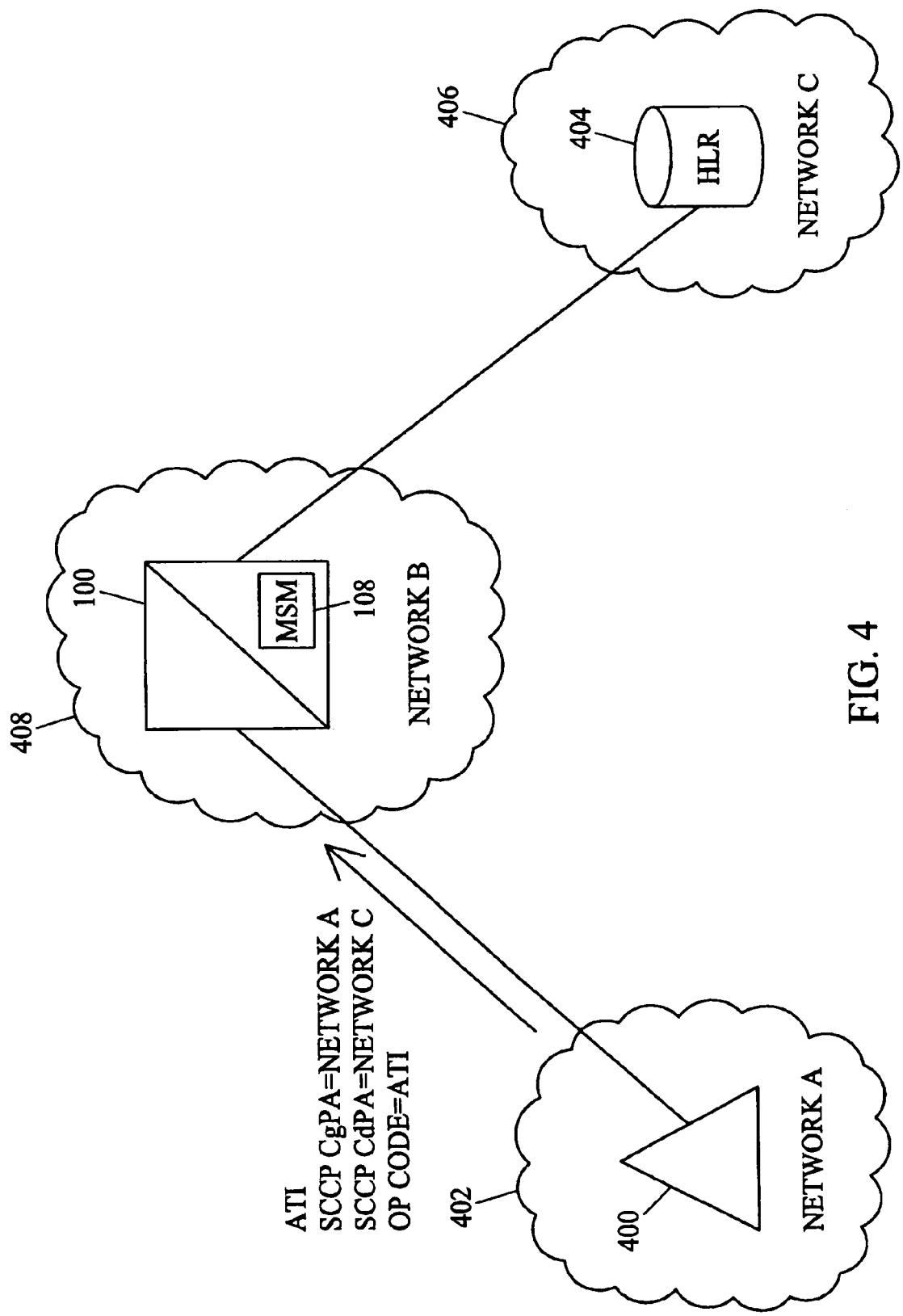
FIG. 4 is a network diagram illustrating exemplary screening of ATI messages in a transit network according to an embodiment of the present invention.

In the example illustrated in FIG. 2, it is assumed that the SCCP messages that are subject to MAP screening are messages that are indicated as route on global title. However, the present invention is not limited to screening MAP messages that are sent route on global title. The present invention may also be configured to screen MAP messages that are sent route on point code and subsystem number. In addition, the present invention may be configured to screen MAP messages in a transit network based on IMSIs or ranges of IMSIs. Screening based on ranges of IMSIs may be desirable in networks that do not support messages sent route on global title. FIG. 4 is a flow chart illustrating exemplary steps that may be performed by a signaling gateway, signal transfer point, or IP telephony signaling message routing node according to an embodiment of the present invention in screening messages that are not sent route on global title and that uses IMSIs screening in addition to SCCP CdPA and CgPA screening. Referring to FIG. 3, steps ST1-ST8 are the same as those illustrated in FIG. 2, with the exception of step ST4. Hence, a description of the repeated steps will not be repeated herein. In step ST4, SCCP messages that are not sent route on-global-title and that are not addressed to the point code of SG 100 may be indicated as candidates for further SCCP and/or MAP screening. In this case, SG 100 may intercept the message for further SCCP processing. Steps ST5-ST9 may follow as described above. In step ST9, however, if SCCP screening does not result in a match, control then proceeds to step ST10 where IMSI screening is performed. An IMSI is an international mobile station identifier stored in the MAP portion of the message. Step ST10 may include decoding the MAP portion of the message to extract the IMSI. The IMSI may then be compared to ranges of IMSIs stored in a table to determine whether the range of IMSIs matches a screening rule. In step ST1, if the IMSI matches one of the screening rules, control proceeds to step ST12 where it is determined whether the MAP opcode indicates a targeted message type. If the message is a targeted message type, control proceeds to step STI3 where the rule is applied. IMSI-based screening may be implemented using a table similar to that illustrated in Table 1 above. However, rather than having ranges of calling and called party numbers to identify networks, IMSIs may be used for this purpose.

In step ST14, if the result of application of the rule is that the message passes, control proceeds to step ST7 where the message is routed. If, however, the message does not pass the screening rule, control proceeds to step ST15 where the message is blocked. As discussed above, if the message passes, it may be recorded for billing purposes.

Returning to step ST9, if the called party or calling party information matches any of the SCCP screening rules, control proceeds to step ST16 where MAP opcode screening is performed. If the opcode matches one of the provisioned opcodes, a rule is applied, and a screening action is performed.

In the example illustrated in FIG. 3, SCCP screening is performed in addition to IMSI screening. However, the present invention is not limited to performing these types of screening in combination with each other. Either type of screening may be performed individually without departing from the scope of the invention.

FIG. 4 is a network diagram illustrating exemplary screening of ATI messages in a transit network according to an embodiment of the present invention. Referring to FIG. 4, it is assumed that an SCP 400 in network A 402 desires to send an ATI message to an HLR 404 in network C 406. The ATI message is sent route on global title through network B 408. Network B 408 includes signaling gateway 100 including transit MAP screening module 108 according to an embodiment of the present invention.

In FIG. 4, SCP 400 sends an ATI message to signaling gateway 100. In the ATI message, the SCCP calling party address is set to a calling party address with a range of calling party addresses for network A 402. The SCCP called party address is set to a value within a range of called party addresses for network C 406. The opcode of the MAP message is set to the MAP opcode for ATI. When signaling gateway 100 receives the message, signaling gateway 100 passes the message to MAP screening module 108 using the steps described above with regard to FIG. 2. In this example, it is assumed that MAP screening module 108 is provisioned to block ATI messages from network A 402 to network C 406. Accordingly, when MAP screening module 108 receives the ATI message, MAP screening module 108 extracts the SCCP called party address from the message and determines that the called party address falls within a range of called party addresses for network C 406. MAP screening module 108 also determines that the calling party address in the message falls within corresponds to a range of calling party address corresponding to network A 402. MAP screening module 108 then determines that the message is an ATI message, which, for these networks, is a message that should be blocked. Accordingly, MAP screening module 108 prevents the ATI message from being forwarded to network C 406.

Figure 5:
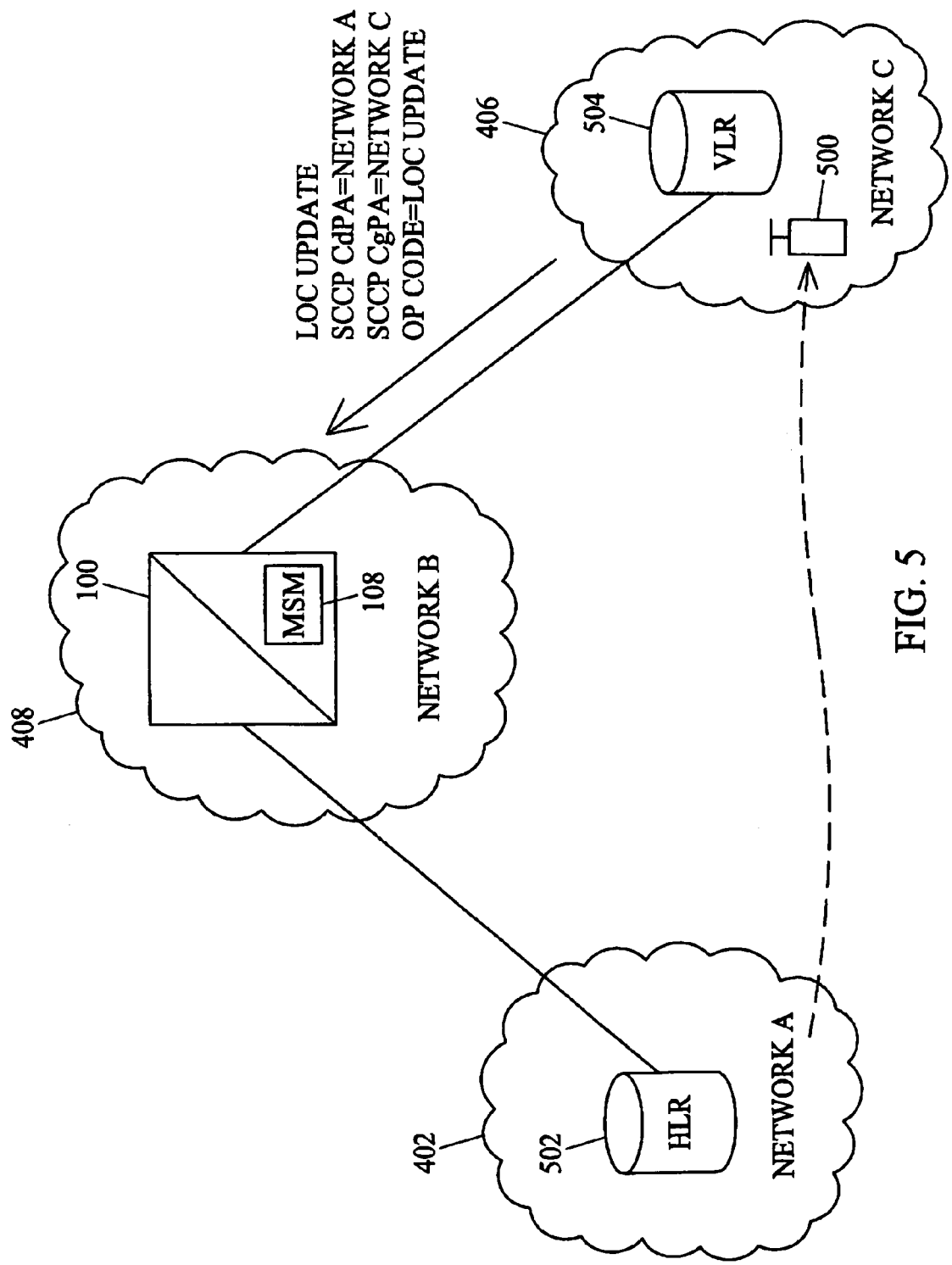
FIG. 5 is a network diagram illustrating screening of location update messages in a transit network according to an embodiment of the present invention.

FIG. 5 is a network diagram illustrating another example of messages that may be blocked by MAP screening module 108 according to an embodiment of the present invention. In FIG. 5, it is assumed that a subscriber 500 of network A 402 has roamed into a service area of network C 406. It is also assumed that network A 402 does not have a roaming agreement with network C 406. In this situation, it may be desirable for network A 402 to be able to block location update messages originating from its subscribers roaming in network C 406 to avoid unnecessary processing by network A's HLR 502.

Accordingly, when subscriber 500 roams into network C 406, VLR 504 formulates a location update message and sends the location update message route on global title to network A 402. In the location update message, the SCCP called party address is set to a called party address within a range of called party addresses for network A 402. The calling party address is set to a range of calling party addresses corresponding to network C 406. The opcode is set to indicate that the MAP message is a location update message.

Signaling gateway 100 receives the location update message and passes the location update message to MAP screening module 108 in the manner described above with regard to FIG. 2. In this example, it is assumed that MAP screening module 108 has a screening rule that does not allow location update messages originating from network C 406 to network A 402 to pass. Accordingly, when MAP screening module 108 receives the location update message, MAP screening module 108 extracts the SCCP called party address and determines that it is within a range of called party addresses for network A 402. MAP screening module 108 extracts the calling party address and determines that is within a range of calling party addresses for network C 406. MAP screening module 108 then determines that the message is a location update message and that this message should be blocked. Accordingly, MAP screening module 108 blocks the message, thus avoiding unnecessary processing by HLR 502.

Figure 6:
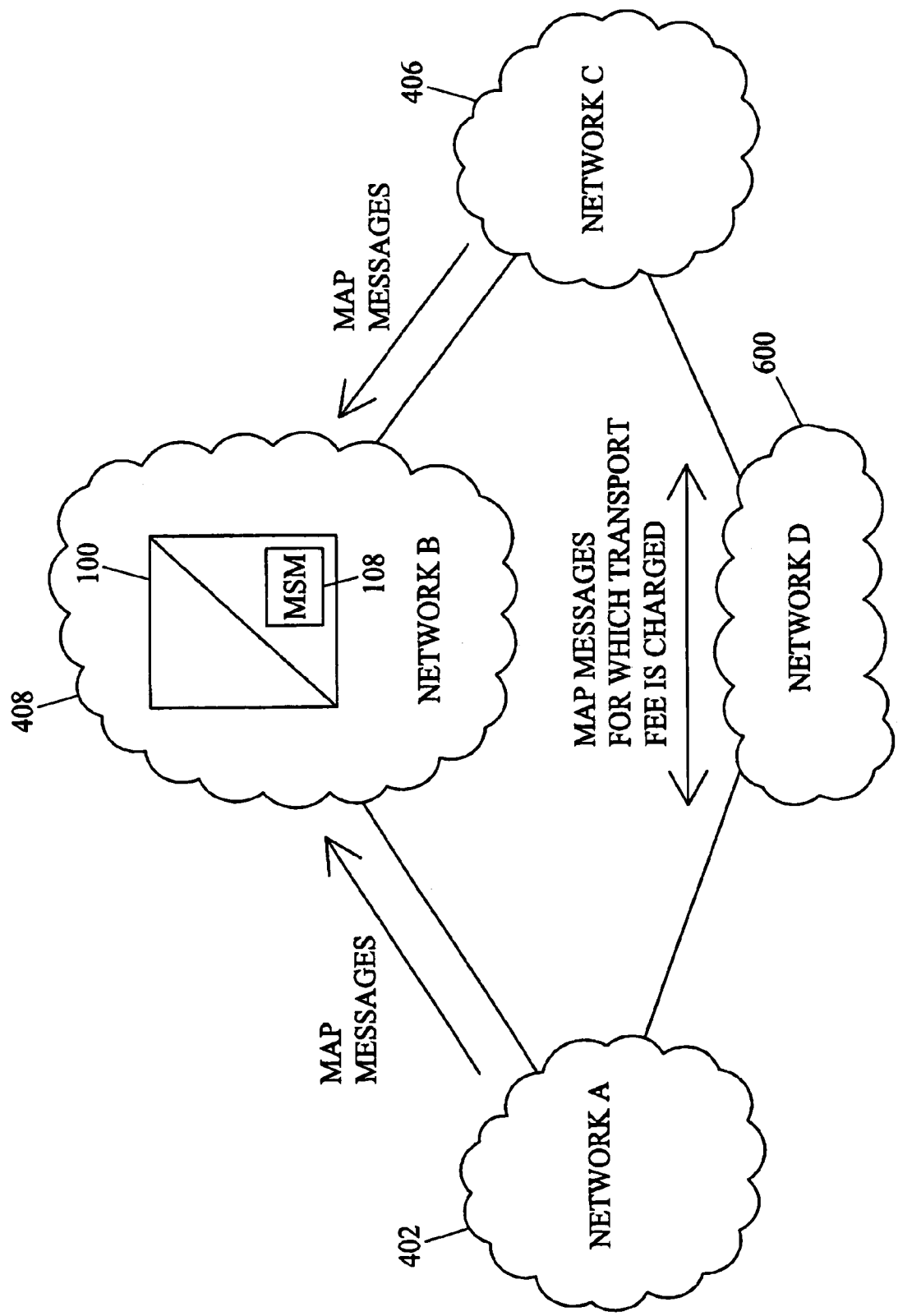
FIG. 6 is a network diagram illustrating exemplary screening of rerouted MAP messages in a transit network according to an embodiment of the present invention.

FIG. 6 is a network diagram illustrating yet another situation in which it may be desirable to block MAP messages in a transit network. Referring to FIG. 6, networks A and C may have an agreement with transit network D 600 to route MAP messages between network A 402 and network C 406. For example, network D 600 may charge networks A and C 402 and 406 a usage rate for routing messages through its network. Although not illustrated in FIG. 6, network D 600 may include a signaling gateway or STP with a MAP screening module to identify MAP messages transmitted between networks A and C 402 and 406 and store MAP message information for billing purposes.

In this example, networks A and C 402 and 406 may determine that they can route MAP messages through another transit network, such as network B 408. Accordingly, networks A and C 402 and 406 may reroute their MAP messages through network B 408.

Initially, network B 408 may route MAP messages between network A 402 and network B 406. However, once the owner of network B 408 determines that it is being used a transit network for messages between network A 402 and network B 406, the owner of network B 408 may provision MAP screening module 108 to block such messages. For example, MAP screening module 108 may be provisioned to recognize MAP messages with called party addresses corresponding to network A 402 and calling party addresses corresponding to network C 406 and vice versa. MAP screening module 108 may then be configured to drop such messages or to count such messages for billing purposes.

Thus, the present invention includes improved methods and systems for MAP screening in transit networks. The methods and systems of the invention may screen MAP messages based on called party addresses in addition to or instead of calling party addresses. Screening based on combinations of called and calling party addresses allows a transit network to implement routing policies tailored to individual networks. In addition, the MAP screening module of the present invention may screen messages based on IMSIs or ranges of IMSIs in networks that do support global title translation.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for screening mobile application part (MAP) messages, the method comprising:
   in a transit network:
   (a) receiving, from a first network, a first signaling message containing MAP protocol information and signaling connection control part (SCCP) information;
   (b) extracting a first called party address from the SCCP information;
   (c) determining whether the first called party address matches first SCCP screening criteria for a first destination network that is a different network from the transit network;
   (d) in response to determining that the first called party address matches the first SCCP screening criteria, extracting a MAP opcode from the MAP protocol information and determining whether the MAP opcode indicates a targeted message type for the first destination network; and
   (e) in response to determining that the MAP opcode indicates a targeted message type, performing a screening action specified by a screening rule for the first destination network.

2. The method of claim 1 wherein determining whether the first called party address matches the first SCCP screening criteria includes determining whether the first called party address falls within a range of called party addresses corresponding to the first destination network.

3. The method of claim 1 wherein determining whether the first called party address matches first SCCP screening criteria includes determining whether the first called party address corresponds to a called party address that has been ported into the first destination network.

4. The method of claim 1 wherein determining whether the first called party address matches first SCCP screening criteria includes determining whether the first called party address corresponds to a called party address that has been ported out of the first destination network.

5. The method of claim 1 wherein determining whether the MAP opcode indicates a targeted message type includes determining whether the MAP opcode indicates an anytime interrogation message.

6. The method of claim 1 wherein determining whether the MAP opcode indicates a targeted message type includes determining whether the MAP opcode indicates a location update message.

7. The method of claim 1 wherein determining whether the MAP opcode indicates a targeted message type includes determining whether the MAP opcode indicates a short message service (SMS) message.

8. The method of claim 1 comprising extracting a first calling party address from the first signaling message and determining whether the first calling party address matches the SCCP screening criteria for the first destination network.

9. The method of claim 8 wherein performing the screening action comprises performing the screening action in response to determining that the first calling and called party addresses both match the first SCCP screening criteria and that the MAP opcode indicates a targeted message type.

10. The method of claim 1 comprising:
    (a) receiving a second signaling message having a second called party address;
    (b) determining whether the second called party address matches second SCCP screening criteria for a second destination network, the second SCCP screening criteria being different from the first SCCP screening criteria and the second destination network being a different network from the first destination network;
    (c) in response to determining that the second called party address matches the second SCCP screening criteria, determining whether the second signaling message is a targeted MAP message type for the second destination network; and
    (d) in response to determining that the second signaling message is a targeted MAP message type, performing a screening action specified by a screening rule for the second destination network.

11. The method of claim 1 wherein performing the screening action includes dropping the message.

12. The method of claim 1 wherein performing the screening action includes generating billing information based on the message.

13. A method for screening mobile application part (MAP) messages that are not sent route on global title, the method comprising: in a transit network:
    (a) receiving a signaling message;
    (b) determining whether the signaling message contains MAP protocol information;
    (c) in response to determining that the signaling message contains MAP protocol information, extracting an international mobile station identifier (IMSI) from the signaling message;

(d) determining whether the IMSI matches IMSI-based screening criteria for a destination network being a different network from the transit network;

(e) in response to determining that the message matches the IMSI-based screening criteria, determining whether the signaling message is a targeted MAP message type for the destination network; and (f) in response to determining that the signaling message is a targeted MAP message type, performing a screening action specified by a screening rule for the destination network.

14. The method of claim 13 wherein in the transit network is located between a first network and the destination network.

15. The method of claim 13 wherein determining whether the IMSI matches IMSI-based screening criteria includes determining whether the IMSI falls within a range of IMSIs for the destination network.

16. The method of claim 13 wherein determining whether the IMSI matches IMSI-based screening criteria includes determining whether the IMSI matches an IMSI corresponding to a subscriber who has been ported into the destination network.

17. The method of claim 13 wherein determining whether the IMSI matches an IMSI corresponding to a subscriber who has been ported out of the destination network.

18. The method of claim 13 wherein determining whether the signaling message is a targeted MAP message type includes decoding a MAP opcode.

19. The method of claim 13 wherein determining whether the signaling message is a targeted MAP message type includes determining whether the signaling message is an anytime interrogation message.

20. The method of claim 13 wherein determining whether the signaling message is a targeted MAP message type includes determining whether the signaling message is a location update message.

21. The method of claim 13 wherein determining whether the signaling message is a targeted MAP message type includes determining whether the signaling message is a short message service (SMS) message.

22. The method of claim 13 wherein performing a screening action includes dropping the message.

23. The method of claim 13 wherein performing a screening action includes extracting and storing information from the message.

24. A signaling message routing node including transit network mobile application part (MAP) screening functionality, the signaling message routing node comprising:

(a) a first module for sending and receiving signaling messages in a transit network between first and second networks, wherein the first module identifies signaling connection control part (SCCP) messages from the signaling messages; and (b) a second module operatively associated with the first module for receiving the identified SCCP messages, for applying destination-network-based SCCP screening criteria to the SCCP messages, wherein applying destination-based SCCP screening criteria includes selecting a MAP-based screening rule specific to a destination network identified by each signaling message, the destination network being a different network from the transit network, and, for each message matching the destination-network-based SCCP screening criteria, for applying the MAP-based screening rule for each destination network.

25. The signaling message routing node of claim 24 wherein the first module comprises an SS7 signaling link interface module for sending and receiving SS7 messages over an SS7 network.

26. The signaling message routing node of claim 24 wherein the first module comprises an IP interface module for sending and receiving IP based signaling messages over an IP network.

27. The signaling message routing node of claim 24 wherein the second module extracts an SCCP called party address from each SCCP message and to determine whether the called party address falls within a range of called party addresses for the destination network.

28. The signaling message routing node of claim 24 wherein the second module extracts an SCCP called party address from each SCCP message and to determine whether the called party address corresponds to an individual called party address that has been ported into the destination network.

29. The signaling message routing node of claim 24 wherein the second module extracts an SCCP called party address from each SCCP message and to determine whether the called party address corresponds to an individual called party address that has been ported out of the destination network.

30. The signaling message routing node of claim 24 wherein the second module determines whether each SCCP message that matches the destination-network-based screening criteria is a targeted MAP message type.

31. The signaling message routing node of claim 30 wherein the targeted MAP message type includes anytime interrogation.

32. The signaling message routing node of claim 30 wherein the targeted MAP message type includes location update.

33. The signaling message routing mode of claim 30 wherein the targeted MAP message type includes short message service.

34. The signaling message routing node of claim 24 wherein the second module drops MAP messages that match the MAP and SCCP screening criteria.

35. The signaling message routing node of claim 24 wherein the second module stores information relating to MAP messages that match the MAP and SCCP screening criteria.

36. The signaling message routing node of claim 24 wherein the second module applies different destination-network-based screening criteria for different destination networks.

37. The signaling message routing node of claim 24 wherein the second module applies SCCP calling party screening criteria to the identified SCCP messages.

38. The signaling message routing node of claim 24 wherein the second module applies IMSI-based screening criteria to received MAP messages.

39. The signaling message routing node of claim 24 wherein the first and second modules are components of a signal transfer point (STP).

40. The signaling message routing node of claim 39 wherein the STP includes a distributed internal processing architecture in which signaling link interface functions are performed by a separate processor from MAP and SCCP screening functions.

* * * * *